Patented Feb. 14, 1933

1,897,528

UNITED STATES PATENT OFFICE

KARL OTT AND HANNS BERNARD, OF UERDINGEN, GERMANY, ASSIGNORS TO I. G. FARBENINDUSTRIE AKTIENGESELLSCHAFT, OF FRANKFORT-ON-THE-MAIN, GERMANY

PAINT

No Drawing. Original application filed August 23, 1928, Serial No. 301,703, and in Germany September 10, 1927. Divided and this application filed December 20, 1929. Serial No. 415,605.

The invention relates to improvements in coating compositions and more particularly to paints comprising a white pigment and yielding smooth coatings of high gloss.

A paint which is composed in the usual manner of a drying oil, with or without the addition of a thinner, and a white pigment, for example zinc oxide, has the tendency to dry to a dull film without gloss when the quantity of the covering pigment exceeds a certain upper limit. Besides, these paints applied to a smooth surface do not yield a smooth coating of uniform appearance but on drying show the strokes of brushing.

We have found that paint vehicles which may be incorporated with considerable amounts of a white pigment to form paints which dry to a glossy and smooth surface can be obtained by adding to the raw materials commonly used, amides of carboxylic acids including carbonic acid. In carrying out our invention we incorporate with the drying oil such as linseed oil and its transformation products, China wood oil or the like an amide of a carboxylic acid or carbonic acid which may be substituted in any manner and which preferably is of relatively low molecular weight, viz., does not contain more than 15 carbon atoms, for example methylol benzamide, butyl urethane, methylol butyl urethane, urethane of ethylene glycol monoethyl ether or the like. A small addition—up to 5 percent—of these compounds is sufficient to produce paint vehicles which are excellently suitable for brushing and yielding coatings of high gloss even with large quantities of covering pigments.

The amount of pigments used, which need not be white pigments, may be considerably higher than customarily in the manufacture of paints without injuring the properties of the varnish.

Our invention is illustrated by the following examples but not restricted thereto. The parts are by weight.

Example 1

1000 parts of stand oil are heated at 110 to 120° C. and mixed with 20 parts of methylol benzamid $C_6H_5CO.NH.CH_2OH$ which is readily dissolved by slight stirring. After cooling down 500 parts of zinc oxide are ground in 330 parts of the mixture in the customary manner to form a paste and mixed with 110 parts of a thinner (for example a mixture of 1 part of turpentine and 9 parts of white spirit). By adding the usual amount of a drier, say, 2 parts of cobalt resinate dissolved in 8 parts of white spirit, a white paint is obtained drying to a smooth coating of high glass.

Example 2

1000 parts of stand oil are heated at 100 to 120° C. and mixed by stirring with 50 parts of methylol butyl urethane $$CH_2OH.NH.CO.OC_4H_9 \text{ (m. p. 63°)}.$$

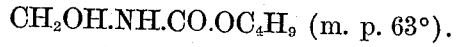

After cooling down 500 parts of zinc oxide and 330 parts of the mixture are ground to form a paste, mixed with 110 parts of a thinner (for example a mixture of 3 parts of turpentine and 7 parts of white spirit) and the usual amount of a drier. The paint thus prepared yields a smooth and glossy film.

Example 3

1000 parts of stand oil are heated at 120 to 140° C. and mixed by stirring with 50 parts of butyl urethane $C_4H_9O.CO.NH_2$. After cooling down 500 parts of zinc oxide and 330 parts of the mixture are ground to form a paste and mixed with 110 parts of a thinner (for example a mixture of 3 parts of turpentine and 7 parts of white spirit) and the usual amount of a drier. The paint thus prepared yields a smooth and glossy film.

This is a division of our co-pending application Ser. No. 301,703 filed August 23rd, 1928.

We claim:

1. A drying oil paint composition containing an urethane.
2. A drying oil paint composition containing methylol butyl urethane.
3. A composition of matter comprising a drying oil, a thinner, zinc oxide, a drier and a N-substituted urethane.
4. A composition of matter comprising a transformation product of linseed oil, a thinner, zinc oxide, a drier and methylol butyl urethane.

5. A composition of matter comprising stand oil, a thinner, zinc oxide, a drier and methylol butyl urethane.

In testimony whereof we affix our signatures.

KARL OTT.
HANNS BERNARD.